Figure 1:
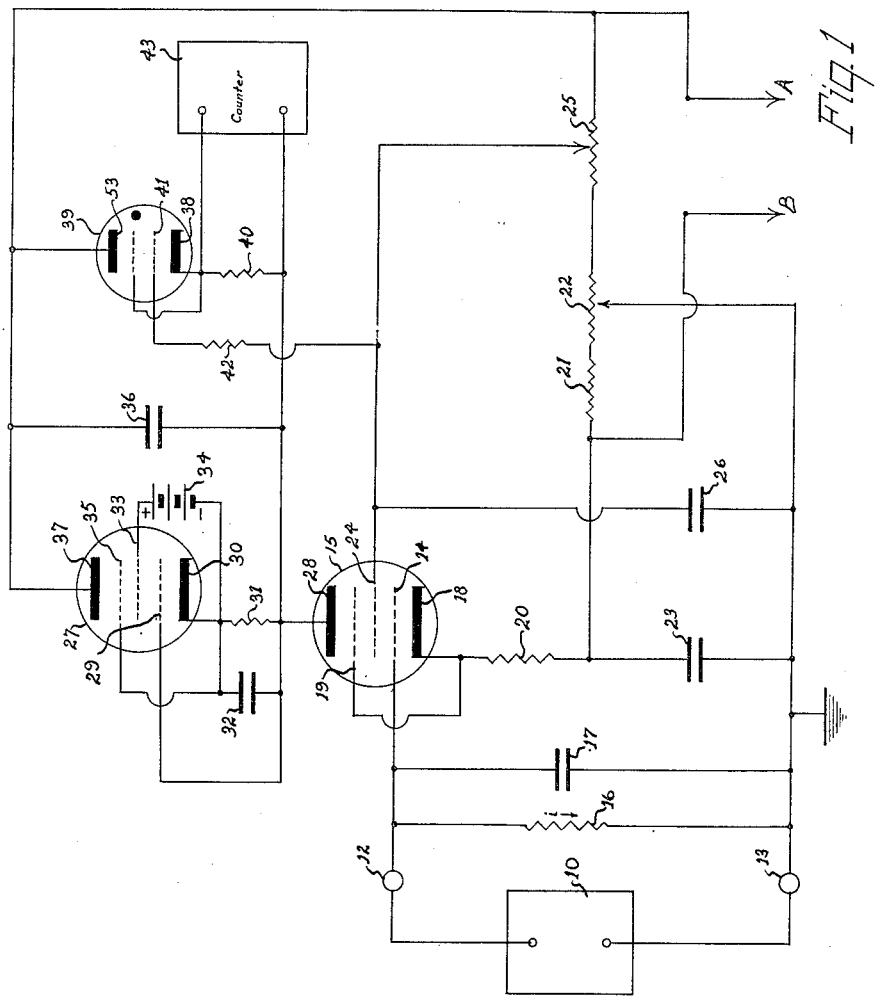

Feb. 27, 1951     D. K. FROMAN     2,543,491
PULSE INTEGRATING CIRCUITS

Filed June 27, 1945     2 Sheets-Sheet 1

WITNESSES
Ralph Carlisle Smith
Ralph G. Miller

INVENTOR.
Darol K. Froman
BY
Robert A. Lavender

Patented Feb. 27, 1951

2,543,491

UNITED STATES PATENT OFFICE 2,543,491

PULSE INTEGRATING CIRCUITS

Darol K. Froman, Denver, Colo., assignor to the United States of America as represented by the United States Atomic Energy Commission Application June 27, 1945, Serial No. 601,803

3 Claims. (Cl. 235—92)

This invention relates to improvements in electronic circuits of the integrating type.

A primary object of the invention resides in the provision of an improved electronic circuit for integrating small currents. It is known to provide electronic circuits for integrating currents over a fixed time wherein measurement of the quantity of electric charges passing through the circuit is obtained by causing the current to be integrated to charge a capacitor of known value and allowing the capacitor to be discharged when the potential difference between the terminals thereof reaches a preassigned value and causing the discharge of the capacitor to actuate indicating means. It is common to associate a thyratron tube in connection with the capacitor in a manner wherein the thyratron tube effects discharge of the capacitor upon the capacitor reaching its preassigned value of charge. The total charge passing through the capacitor in a given time is then found by counting, usually electrically, the number of times the capacitor is discharged. In many applications the above type of circuit has been found unreliable and sometimes unusable, since for good precision it is necessary to charge a capacitor to a potential of the order of 100 volts with the attendant requirement that the resistance of the leakage path in the circuit under test which shunts the capacitor must be very high to insure a leakage loss which is negligible, even when the capacitor is charged to 100 volts, for example. Further, it may not in many cases be possible to operate the circuit properly when the potential at a given point therein varies in a saw-tooth manner in the order of 100 volts, since voltage fluctuations in this order may seriously affect the magnitude of the current being measured.

With the above prior art limitations in mind, it is a primary object of the present invention to provide an improved integrating circuit of the type employing capacitor build-up followed by discharge for the integration of currents introduced within the circuit, wherein the potential difference developed in the circuit by currents to be integrated is of low order, for example 10 volts or less, and does not fluctuate while the current is steady. Also, the leakage loss around the integrator in the improved circuit can be hundreds of times greater for the same precision obtainable in prior art circuits.

A further object of the invention is to provide an improved integrating circuit which employs the operating characteristics of pentode tubes in connection with an integrating capacitor and thyratron discharge tube in a manner wherein one pentode tube is series connected in the input of the said device in a manner to effectively pass the quantity of charge to be measured to the integrating capacitor while acting as a decoupler to prevent potential variations in other portions of the circuit from having an effect on the source of the current to be integrated.

A still further object of the invention is to provide in an integrating circuit improved means for energizing thermionic cathodes in the electron discharge devices employed therein. Since integrating circuits of the above general type are generally constant current circuits, it is common practice to employ various types of voltage regulating circuits in association with the source of anode and control element potentials. While the employment of such regulation circuits are in part effective, it is apparent that constant current circuits cannot be completely effective when used in conjunction with a source of heater current which is subject to variation due, for example to variations in line potential. The present device incorporates heater current regulating means associated with a regulated voltage source which provides the various anode and control element potentials in a manner wherein compensation is obtained between variations in the several potential sources to insure effective operation of the constant current circuit employed within the integrating portion of the device.

Other objects and advantages of the present invention will become apparent to persons skilled in the art upon examination of the drawings and the description, the inventive aspects of which are set forth in the appended claims.

Figure 2:
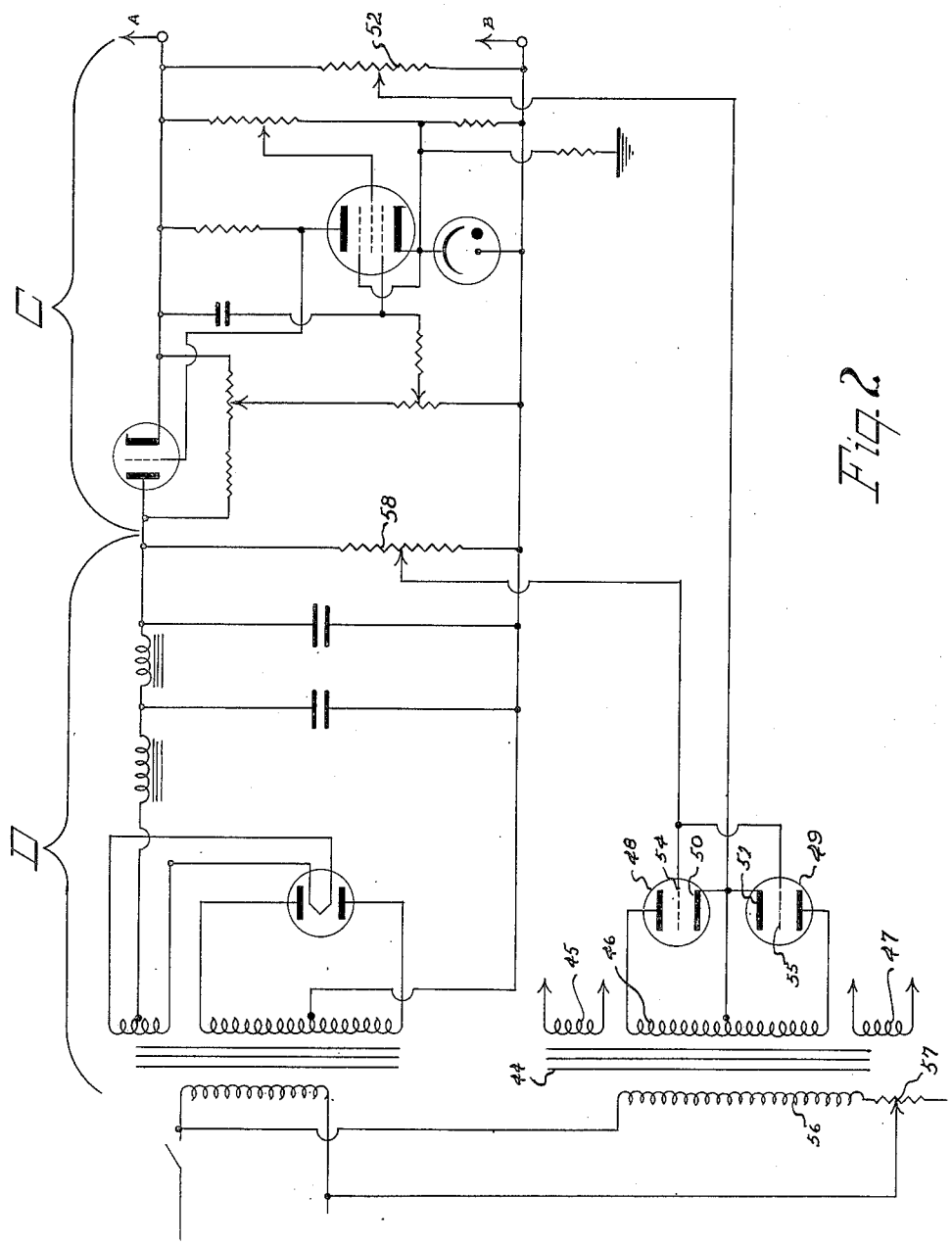

Referring to the drawings, Figures 1 and 2 represent in schematic form a circuit embodying the present invention. As shown in Figure 1, a source of current 10 is connected between input terminals 12 and 13, current source 10 being illustrated in block form since this source may be any of a variety of devices, for example an ionization chamber. Input terminal 13 is connected to ground and input terminal 12 is connected directly to control grid 14 of vacuum tube 15 which is preferably of the pentode type. Current to be integrated flows in the direction indicated through resistor 16 connected between terminals 12 and 13, resistor 16 being of a value to insure that the maximum value of potential difference thereacross will not exceed a certain value as, for example 10 volts. Capacitor 17 is connected in parallel with resistor 16 for the purpose of preventing rapid fluctuations of the potential difference across resistor 16. Cathode 18 of tube 15 is connected directly to suppressor grid 19 and is maintained at a positive potential with respect to control grid 14 by means of resistors 20 and 21 and a portion of potentiometer 22, resistor 21 and the above mentioned portion of potentiometer 22 being by-passed to ground through capacitor 23. Screen grid 24 is maintained at a suitable positive potential with respect to cathode 18 by means of potentiometer 25 and is by-passed to ground through capacitor 26. Vacuum tube 27 is connected in a known manner to act as a constant current device in series with anode 28 of tube 15. Tube 15 is preferably arranged to operate on the linear portion of its characteristic. Under static or quiescent conditions, i. e., no current flow through resistor 16, bias of tube 15 is adjusted by means of potentiometer 22 to equalize the anode current of tube 15 with the cathode current of tube 27 thereby determining a condition of non-conductivity of the thyratron. Control grid 29 of tube 27 is connected directly to anode 28 of tube 15. Cathode 30 is connected to anode 28 through resistor 31, capacitor 32 being in shunt therewith. Screen grid 33 is maintained at a positive potential with respect to cathode 30 by means of a suitable potential source 34, shown in Figure 1 as a battery although the same function may be performed by a suitable voltage regulated power supply. Suppressor grid 35 is directly connected to cathode 30. Capacitor 36 is connected between anode 37 of tube 27 and anode 28 of tube 15. Polarizing potential for the operation of the circuit of Figure 1 is applied between the terminals designated A and B, terminal A being positive with respect to B, from a suitable regulated voltage power supply, such as that designated generally by C and D, Figure 2.

The operation of the circuit may be understood by assuming current to flow in the direction indicated through resistor 16 thereby causing the potential of control grid 14 to increase with respect to cathode 18 of tube 15. This increase of potential acts in a conventional manner to increase the value of anode current in tube 15. As mentioned above, tube 27 is connected in a manner to operate as a constant current device so that any change in the anode current of tube 15 must be supplied through capacitor 36. Charge accumulated on capacitor 36 in this manner causes the potential difference between anode 53 and cathode 38 of a discharge tube 39, connected in parallel therewith, ultimately to reach such a value as to initiate current conduction therethrough, said current conduction quickly discharging capacitor 36. Tube 39 is of a suitable type, such as a thyratron, in which conduction is terminated upon removal of anode voltage. Discharge of capacitor 36 through tube 39 results in a positive voltage pulse appearing across resistor 40, connected in series with tube 39 and capacitor 36. The discharge of capacitor 36 lowers the anode to cathode potential difference in tube 39 to a value which insures termination of conduction through said tube. Control grid 41 of tube 39 is caintained at a negative potential with respect to cathode 38 by connection through resistor 42 to screen grid 24 of tube 15, a condition which establishes non-conduction in thyratron 38. A suitable counting device 43 is connected across resistor 40 for the purpose of counting the number of times capacitor 36 is discharged. Counting device 43 gives therefore an indication of the number of times that capacitor 36 has reached its peak value of charge and hence a proportional indication of the total quantity of charge flowing through resistor 16.

It is apparent from the above description of the operation of the circuit that the advantages outlined in the objects obtain in the present circuit. Since resistor 16 may have a reasonably low value while still producing an appreciable change in the potential of control grid 14, and hence in the anode current of tube 15, the high resistance leakage path usually present between the output terminals of the device represented by the current source 10 is not subjected to voltages which would result in appreciable current flow through such a path, nor is the flow of current from source 10 impeded by a large potential difference appearing across the output terminals thereof. Accuracy is further improved by the action of tube 15, acting essentially as a linear current amplifier; for example, a microampere of current flowing through resistor 16 may easily result in a milliampere of current to charge capacitor 36, thus a given leakage loss inherent in capacitor 36 introduces a much smaller error when capacitor 36 is charged by large currents, for example by milliamperes instead of microamperes.

Referring to Figure 2, there is shown in schematic diagram a voltage regulated power supply serving the dual function of providing constant polarizing potentials for the circuit shown in Figure 1, the output terminals A and B connecting to corresponding terminals, Figure 1, as well as providing regulated filament voltages for tubes 27 and 15 of the circuit of Figure 1, to aid in rendering that circuit unaffected by line voltage fluctuations, etc. Transformer 44 of Figure 2 is provided with three secondary windings 45, 46, and 47, vacuum tubes 48 and 49 being connected in push-pull arrangement between the center tap and each outside lead of winding 46. Cathodes 50 and 51 of tubes 48 and 49, respectively, are maintained at a fixed potential with respect to ground by means of potentiometer 52 which is connected in parallel with the regulated output of the conventional voltage regulating circuit generally designated C and D. Control grids 54 and 55 of tubes 48 and 49, respectively, are maintained at a small negative potential with respect to cathodes 50 and 51, respectively, by means of potentiometer 58 connected in parallel with the unregulated output voltage from the filter section D of the regulated voltage supply comprising sections C and D.

Regulation of the filament voltage provided by secondary windings 45 and 47 is obtained in the following manner. Transformer 44 is excited by primary winding 56 connected in series with rheostat 57 to a suitable source of alternating current power such as a commercial 110 volt power line. Secondary windings 45 and 47 are designed to deliver a voltage slightly in excess of that required by the filaments of tubes 15 and 27, this voltage being decreased by insertion of a suitable portion of rheostat 57 in series with primary winding 56 so that secondary windings 45 and 47 operate at the proper potential when transformer 44 is loaded by current conduction through tubes 48 and 49 on alternate half cycles of the applied voltage. An increase in the line voltage applied to primary winding 56 would normally result in an increased filament voltage from windings 45 and 47, however, the assumed increase in line voltage also results in an increased potential appearing across potentiometer 58. A portion of this increased potential is introduced on control grids 54 and 55 of tubes 48 and 49 causing an increase in current conduction through these tubes and hence an increased loading of transformer 44. With suitable design the above mentioned increased loading of transformer 44 may be sufficient to cancel the effect of an increase in line voltage thereby providing a constant filament voltage from windings 45 and 47.

Other adaptations and embodiments of the invention will become apparent to persons skilled in the art without departing from the spirit and scope thereof as defined with particularity in the following claims.

I claim:

1. An electric system for measuring a quantity of electric charges impressed thereon, comprising an electron discharge device having at least a cathode, a grid and an anode, an integrating network having charge impressing terminals connected thereacross, said integrating network being connected in series with the grid-cathode interelectrode space, a constant current device connected in series with the anode-cathode interelectrode space of said electron discharge device and with a source of anode potential, a capacitor in shunt with the constant current device, a gaseous discharge device and a resistor serially connected therewith, connected in shunt with said capacitor, output terminals connected to spaced portions on said resistor, whereby a potential positive with respect to said grid is generated by electric charges accumulated in said integrating network thereby reducing the voltage drop across said electron discharge device and increasing the potential drop across said constant current device, thereby charging said condenser, said gaseous discharge device being adjusted to fire at a selected value of potential across said condenser thus generating a unidirectional pulse on said output terminals in response to a selected quantity of charge impressed on said input terminals.

2. An electric system for indicating the sum of electric charges impressed thereon, comprising a vacuum tube having at least a cathode, a grid and an anode, a pentode, a source of anode potential and a gas discharge tube; said pentode being connected as a constant current device in series with the interelectrode space of the vacuum tube and the source of anode potential, said gas discharge device being connected in shunt with the interelectrode space of the pentode, an integrating network having input terminals connected in series with the grid-cathode interelectrode space of the vacuum tube, and circuit means for adjusting potentials impressed on the gaseous discharge tube for breakdown at a predetermined potential across said input pentode, said predetermined potential being proportional to the cumulated effects of charges impressed on the grid of said vacuum tube, and means coupled to the gaseous discharge device to register the occurrence of breakdown thereof whereby the registration is proportional to the quantity of charges impressed on said input terminals.

3. An electronic circuit for integrating small currents, comprising a vacuum tube having at least a cathode, a grid and an anode, a constant current resistance, and a source of anode potential; circuit means connecting the vacuum tube cathode-anode interelectrode space in series with the constant current resistance and the source of anode potential, an integrating network comprising a resistor and capacitor connected in parallel, means connecting said integrating network in shunt with the vacuum tube cathode-grid interelectrode space, a pair of input terminals electrically connected to spaced portions of said integrating network resistor, a capacitor having a first terminal and a second terminal, means electrically connecting the first terminal to one end of the constant current resistance and means electrically connecting the second terminal to the other end of the constant current resistance, a gaseous discharge device having at least a first and a second electrode, a load resistor, means electrically connecting one end of the load resistor to the discharge device first electrode, and means electrically connecting the discharge device second electrode to the capacitor second terminal, means electrically connecting the load resistor free end to the capacitor first terminal and output terminals connected to each end of the load resistor.

DAROL K. FROMAN.

REFERENCES CITED

The following references are of record in the file of this patent:

UNITED STATES PATENTS

| Number | Name | Date |
|---|---|---|
| 1,995,890 | Lord | Mar. 26, 1935 |
| 2,064,019 | Little | Dec. 15, 1936 |
| 2,095,388 | Hyland | Oct. 12, 1937 |
| 2,157,534 | George et al. | May 9, 1939 |
| 2,227,490 | Draper | Jan. 7, 1941 |
| 2,374,248 | Tuttle | Apr. 24, 1945 |
| 2,378,422 | McGoldrick | June 19, 1945 |